(12) United States Patent
Reinhard et al.

(10) Patent No.: US 8,779,370 B2
(45) Date of Patent: Jul. 15, 2014

(54) ANOMALY DETECTION OF RADIOLOGICAL SIGNATURES

(75) Inventors: Mark Reinhard, Kirrawee DC (AU); David Boardman, Maroubra (AU)

(73) Assignee: Australian Nuclear Science and Technology Organisation, Lucas Heights, New South Wales (AU)

( * ) Notice: Subject to any disclaimer, the term of this patent is extended or adjusted under 35 U.S.C. 154(b) by 148 days.

(21) Appl. No.: 13/509,086

(22) PCT Filed: Nov. 11, 2010

(86) PCT No.: PCT/AU2010/001509
§ 371 (c)(1),
(2), (4) Date: Aug. 23, 2012

(87) PCT Pub. No.: WO2011/057339
PCT Pub. Date: May 19, 2011

(65) Prior Publication Data
US 2012/0311933 A1 Dec. 13, 2012

(30) Foreign Application Priority Data
Nov. 11, 2009 (AU) .............................. 2009905545

(51) Int. Cl.
*G06F 15/00* (2006.01)
(52) U.S. Cl.
USPC .................................................. 250/370.06
(58) Field of Classification Search
USPC .................................................. 250/370.06
See application file for complete search history.

(56) References Cited

U.S. PATENT DOCUMENTS

| | | | |
|---|---|---|---|
| 6,839,636 B1 * | 1/2005 | Sunshine et al. | 702/22 |
| 2004/0119591 A1 * | 6/2004 | Peeters | 340/539.26 |
| 2007/0108379 A1 | 5/2007 | Rowland et al. | |
| 2007/0278415 A1 | 12/2007 | Gentile et al. | |
| 2009/0114830 A1 * | 5/2009 | Rubenstein | 250/370.08 |

FOREIGN PATENT DOCUMENTS

WO 2009/126455 A1 10/2009

OTHER PUBLICATIONS

Gosnell, T.B. et al.; "Gamma-Ray Identification of Nuclear Weapon Materials"; *UCRL-ID-127436, Lawrence Livermore National Library*; Feb. 3, 1997; pp. 1-54.

(Continued)

*Primary Examiner* — Marcus Taningco
(74) *Attorney, Agent, or Firm* — Kilpatrick Townsend & Stockton LLP

(57) ABSTRACT

Described herein is a method for determining the presence or absence of anomalous radioactive materials in a target in a detection zone. In the method, a target gamma ray spectrum is obtained from the target and a target data set is prepared from the target gamma ray spectrum. This data set comprise a plurality of intensity values, each intensity value being associated with an energy bin representing a gamma ray energy or range of gamma ray energies in the target gamma ray spectrum. The target data set is then pre-processed and projected into a principal component space which contains a pre-processed data library projected into the principal component space. A distance is then determined between the projected pre-processed target data set and one or more clusters of the projected pre-processed data library in the principal component space and this distance is compared with a predetermined threshold distance so as to determine if an anomalous radioactive material is present in the target.

20 Claims, 5 Drawing Sheets

(56) References Cited

OTHER PUBLICATIONS

Runkle, Robert C. et al.; "Analysis of Spectroscopic Radiation Portal Monitor Data Using Principal Components Analysis"; *IEEE Transactions on Nuclear Science*, Jun. 2006; pp. 1418-1423; vol. 53; No. 3.

Tardiff, Mark F. et al.; "Anomaly Detection in Gamma-Ray Vehicle Spectra with Principal Components Analysis and Mahalanobis Distances"; *1st Joint Emergency Preparedness and Response/Robotic and Remote Sytems Topical Meeting: Sharing Solutions for Emergencies and Hazardous Environments*; Feb. 11-16, 2006; pp. 710-717.

Notice of Acceptance in AU Application No. 2010317664, dated Sep. 4, 2013.

* cited by examiner

ANOMALY DETECTION OF RADIOLOGICAL SIGNATURES

This application is a U.S. National Phase under 35 USC 371 of PCT Application No. PCT/AU2010/001509 filed Nov. 11, 2010, which claims priority to the Australian Application No. 2009905545, filed Nov. 11, 2009, the disclosures of which are incorporated by reference herein.

TECHNICAL FIELD

The present invention relates to a method for detecting anomalous sources of gamma radiation.

BACKGROUND OF THE INVENTION

There is a need to detect the presence of radioactive materials so as to prevent unauthorised passage of such materials across national borders, or into regions in which such materials are prohibited. A suitable method would be capable of performing the detection as a vehicle passed through a detection zone, preferably without stopping in the zone, so as not to excessively impede the flow of traffic. Thus the method would preferably be capable of detecting the presence of such materials in a period of about 10 seconds or less. The method should preferably have high accuracy, i.e. a low level of both false positives (signalling an alarm when no suspect material is present) and false negatives (failing to detect the presence of suspect material).

Such detection is complicated by the fact that acceptable materials may emit a certain level of ionising radiation, for example due to the presence of elevated concentrations of naturally occurring radioactive materials (NORMs), or of legitimate radiopharmaceutical products etc. Some existing systems, which use simple plastic scintillation detectors, measure only the gross level of radiation, in the form of gamma-rays, emitted by a target. Such systems are prone to a high rate of false positives if the threshold level of radiation detection is set too low or a high rate of false negatives if the threshold level of radiation detection is set too high. Such systems are unable to distinguish legitimately traded goods containing elevated concentrations of NORMs from illicit or inadvertent and unlicensed goods containing radioactive materials.

A second generation of detectors sought to measure the gamma ray spectrum of the target and compare that spectrum to the spectra of known controlled or other radioactive materials of interest. Such detectors, commonly referred to as spectroscopic detectors, identify the isotopes through the presence of specific gamma ray lines (energies) being present in a measured gamma-ray spectrum. High resolution spectroscopic equipment of this type is very expensive and is subject to poor reliability in field deployment due to the challenging operating conditions. Lower resolution spectroscopic equipment is less expensive but is subject to poorer performance with respect to correct isotope identification leading to high rates of both false positive and false negative alarm rates.

OBJECT OF THE INVENTION

It is an object of the present invention to substantially overcome or at least ameliorate one or more of the above disadvantages.

SUMMARY OF THE INVENTION

In a first aspect of the invention there is provided a method for determining the presence or absence of anomalous radioactive materials in a target in a detection zone, said method comprising:

(i) obtaining a target gamma ray spectrum from the target;
(ii) preparing, from the target gamma ray spectrum, a target data set comprising a plurality of intensity values, each intensity value being associated with an energy bin representing a gamma ray energy or range of gamma ray energies in the target gamma ray spectrum;
(iii) pre-processing the target data set;
(iv) projecting the pre-processed target data set into a multidimensional, e.g. principal component, space containing a pre-processed data library projected into said multidimensional, e.g. principal component, space;
(v) determining a distance between the projected pre-processed target data set and one or more clusters of the projected pre-processed data library in the multidimensional, e.g. principal component, space; and
(vi) comparing the distance with a predetermined threshold distance so as to determine if an anomalous radioactive material is present in the target.

If the distance is greater than (or greater than or equal to) the threshold distance a signal may be generated in response to the presence of the anomalous radioactive material in the target. In a variation, a signal may be generated only if the distance is less than the threshold distance, indicating the absence of anomalous radioactive material in the target.

The following options may be used in conjunction with the first aspect (and, where appropriate, any of the other aspects described below), either individually or in any suitable combination.

The method may additionally comprise the step of rebinning the target data set prior to the step of pre-processing the target data set. The rebinning may comprise aggregating the intensity values of at least two adjacent energy bins to form a new energy bin.

The step of pre-processing (either of the target data step or of the data library) may comprise normalising. It may comprise intensity normalising. It may comprise normalising with respect to the highest intensity value across all energy bins. The step of pre-processing may comprise standardising each observed spectrum to have zero mean and unit variance across all energy bins. The step of pre-processing may comprise standardising each energy bin (variable) with respect to the mean and standard deviation of each energy bin from the data library. Each intensity value may represent a number of counts for its associated energy bin.

The pre-processed data library may be obtained using a procedure similar to that used for obtaining the pre-processed target data set. Thus it may be obtained by a process comprising:

iv-a) obtaining a data library comprising reference gamma ray spectra from Naturally Occurring Radioactive Materials and optionally other sources (these may be normal sources or may be anomalous sources or some may be normal and others anomalous);
iv-b) preparing a reference data set from each of the reference gamma ray spectra, each reference data set comprising a plurality of intensity values, each intensity value being associated with an energy bin representing a gamma ray energy or range of gamma ray energies in said reference gamma ray spectrum; and
iv-c) pre-processing each reference data set to obtain the pre-processed data library.

The method may additionally comprise the step of rebinning each reference data set prior to the step of pre-processing the reference data sets. The pre-processing should be the same as that used for the target data set. Thus the pre-processing may be, or may comprise, normalising, whereby the pre-processed data library may be a normalised data library.

The principal component space may be defined by a plurality of principal components obtained by principal component analysis (PCA) of the pre-processed data library's correlation matrix. The PCA may comprise an eigenanalysis or eigen decomposition of the correlation matrix. It may produce the eigenvalues and eigenvectors of the correlation matrix. The principal component space may comprise less than about 20 principal components.

The target data set and the data library may both comprise supplementary data not derived from the gamma ray spectrum. The supplementary data may be non-spectral data. It may for example comprise at least one of: temperature of the target, heat output of the target, time variation of the target as it passes through the detection zone, geographical origin of the target, target supplier, gross count, manifest. The data library may comprise at least as many reference data sets (spectra) as data variables. In this context data variables include the energy bins and the supplementary data. The supplementary data of both the data library and the target data set should be the same in both number and type (although not necessarily in value). Thus the supplementary data for the target and for all reference samples may for example be temperature and country of origin. In some cases the supplementary data may be manipulated, for example the country of origin information may be translated into a threat score. The supplementary data should be expressed in the same measurement units for both the target and reference data sets.

The distance of step (v) may be a Bregman distance. It may be a Mahalanobis distance. It may be some other characteristic distance.

Step (i) of the method may comprise acquiring the target gamma ray spectrum as the target passes through the detection zone. The target may for example be, or may comprise, or may be located in and/or on, a vehicle (e.g. car, truck, train carriage), cargo, a package, a freight container, luggage or a person. Step (i) may be conducted without the target stopping in the detection zone. The target gamma ray spectrum may be acquired in less than about 10 seconds. The target gamma ray spectrum may be acquired in more than about 10 seconds. It may be acquired by means of a portable gamma radiation monitor system or may be acquired by means of a fixed gamma radiation monitor system.

If the distance is less than the threshold distance a signal may be generated in response to the absence of the anomalous radioactive material in the target.

The signal generated in response to the presence of the anomalous radioactive material may activate an alarm, either audible or visual or both. It may trigger the lowering of a boom gate or activation of some other barrier so as to prevent further passage of the target past the detection zone. It may be a local signal. It may be a remote signal. It may be an electronic signal. The signal may trigger or activate more than one of the above.

In an embodiment there is provided a method for determining the presence or absence of anomalous radioactive materials in a target in a detection zone, said method comprising:
(i) obtaining a target gamma ray spectrum from the target;
(ii) preparing, from the target gamma ray spectrum, a target data set comprising a plurality of intensity values, each intensity value being associated with an energy bin representing a gamma ray energy or range of gamma ray energies in the target gamma ray spectrum, and rebinning the target data set;
(iii) pre-processing the target data set;
(iv) projecting the pre-processed target data set into a principal component space containing a pre-processed data library projected into said principal component space;
(v) determining a distance between the projected pre-processed target data set and one or more clusters of the projected pre-processed data library in the principal component space; and
(vi) comparing the distance with a predetermined threshold distance so as to determine if an anomalous radioactive material is present in the target,
to wherein, either:
if the distance is greater than (or greater than or equal to) the threshold distance a signal is generated in response to the presence of the anomalous radioactive material in the target; or
if the distance is less than the threshold distance a signal is generated in response to the absence of the anomalous radioactive material in the target.

In another embodiment there is provided a method for determining the presence or absence of anomalous radioactive materials in a target in a detection zone, said method comprising:
(i) obtaining a target gamma ray spectrum from the target;
(ii) preparing, from the target gamma ray spectrum, a target data set comprising a plurality of intensity values, each intensity value being associated with an energy bin representing a gamma ray energy or range of gamma ray energies in the target gamma ray spectrum;
(iii) normalising the target data set;
(iv) projecting the normalised target data set into a principal component space containing a normalised data library projected into said principal component space;
(v) determining a distance between the projected normalised target data set and one or more clusters of the projected normalised data library in the principal component space; and
(vi) comparing the distance with a predetermined threshold distance so as to determine if an anomalous radioactive material is present in the target,
whereby either:
if the distance is greater than (or greater than or equal to) the threshold distance a signal is generated in response to the presence of the anomalous radioactive material in the target; or
if the distance is less than the threshold distance a signal is generated in response to the absence of the anomalous radioactive material in the target.

In another embodiment there is provided a method for determining the presence or absence of anomalous radioactive materials in a target in a detection zone, said method comprising:
(i) obtaining a target gamma ray spectrum from the target;
(ii) preparing, from the target gamma ray spectrum, a target data set comprising a plurality of intensity values, each intensity value being associated with an energy bin representing a gamma ray energy or range of gamma ray energies in the target gamma ray spectrum;
(iii) normalising the target data set;
(iv) projecting the normalised target data set into a principal component space containing a normalised data library projected into said principal component space;
(v) determining a distance between the projected normalised target data set and one or more clusters of the projected normalised data library in the principal component space; and
(vi) comparing the distance with a predetermined threshold distance so as to determine if an anomalous radioactive material is present in the target, whereby if the distance is greater than (or greater than or equal to) the threshold distance a signal is generated in response to the presence of the anomalous radioactive material in the target.

In another embodiment there is provided a method for determining the presence or absence of anomalous radioactive materials in a target in a detection zone, said method comprising:

obtaining a data library comprising reference gamma ray spectra from Naturally Occurring Radioactive Materials and optionally other sources (for example other normal sources, although in some cases other abnormal or anomalous sources may be included);

preparing a reference data set from each of the reference gamma ray spectra, each reference data set comprising a plurality intensity values, each intensity value being associated with an energy bin representing a gamma ray energy or range of gamma ray energies in said reference gamma ray spectrum, and rebinning the reference data sets;

pre-processing each reference data set to obtain a pre-processed data library;

optionally supplementing the data library with supplementary data obtained from the Naturally Occurring Radioactive Materials and optionally other sources;

conducting principal component analysis (PCA) on the pre-processed data library's correlation matrix so as to obtain a plurality of principal components;

obtaining a target gamma ray spectrum from the target;

preparing, from the target gamma ray spectrum, a target data set comprising a plurality of intensity values, each intensity value being associated with an energy bin representing a gamma ray energy or range of gamma ray energies in the target gamma ray spectrum, and rebinning the target data set;

pre-processing the target data set;

projecting the pre-processed target data set into a principal component space defined by the principal components and containing the pre-processed data library projected into said principal component space;

determining a distance between the projected pre-processed target data set and one or more clusters of the projected pre-processed data library in the principal component space; and comparing the distance with a predetermined threshold distance so as to determine if an anomalous radioactive material is present in the target, wherein, if the distance is greater than (or greater than or equal to) the threshold distance a signal may be generated in response to the presence of the anomalous radioactive material in the target. The data library and the target data set will possess information on the same variables, which may include supplementary data.

In a second aspect of the invention there is provided an apparatus for determining the presence or absence of anomalous radioactive materials in a target in a detection zone, said apparatus comprising:

a detector for obtaining a target gamma ray spectrum from the target, a memory for storing the target gamma ray spectrum and a pre-processed data library, a processor coupled to the memory for preparing from the target gamma ray spectrum a target data set comprising a plurality of intensity values, each bin being associated with an energy bin representing a gamma ray energy or range of gamma ray energies in the target gamma ray spectrum; pre-processing (e.g. normalising) the target data set; projecting the pre-processed (e.g. normalised) target data set into a multidimensional, e.g. principal component, space containing the pre-processed (e.g. normalised) data library projected into said multidimensional, e.g. principal component, space; determining a distance between the projected pre-processed (e.g. normalised) target data set and one or more clusters of the projected preprocessed (e.g. normalised) data library in the multidimensional, e.g. principal component, space; and comparing the distance with a predetermined threshold distance so as to determine if an anomalous radioactive material is present in the target, whereby either (a) if the distance is greater than (or greater than or equal to) the threshold distance a signal is generated in response to the presence of the anomalous radioactive material in the target or (b) if the distance is less than the threshold distance a signal is generated in response to the absence of the anomalous radioactive material in the target; and an output device for either (a) accepting the signal when an anomalous radioactive material is present in the target in order to generate a physical response to the presence of the anomalous radioactive material or for (b) accepting the signal when an anomalous radioactive material is absent in the target in order to generate a physical response to the absence of the anomalous radioactive material.

The detector may be capable of obtaining reference gamma ray spectra from Naturally Occurring Radioactive Materials (NORM) arid optionally other sources (optionally other normal sources, possibly other abnormal or anomalous sources) and the processor may be capable of processing (e.g. normalising) the reference gamma ray spectra to form the pre-processed (e.g. normalised) data library from the pre-processed reference spectra.

The processor may be capable of performing Principal Component Analysis (PCA) on the pre-processed data library's correlation matrix so as to generate principal components for the principal component space. The processor may comprise a supplementary input facility for inputting supplementary data for use in determining the presence or absence of anomalous radioactive materials. It may for example comprise a facility for inputting data relating to the source of the target and/or of the reference materials. It may comprise facility for converting non-numerical inputted data (e.g. country of origin) to be converted to a numerical value for use in the method.

The apparatus may have one or more supplementary detectors for obtaining supplementary data from the target. Suitable supplementary detectors may for example include a non-contact thermometer.

In an embodiment the apparatus is an apparatus for preventing passage of anomalous radioactive material. In this embodiment, the physical response of the output device represents activation of a device to prevent passage of the anomalous radioactive material and/or of a vehicle transporting it. The device to prevent passage may for example comprise a boom gate or road spikes or movable bollards or stanchions, or may comprise a signalling device for signalling to security personnel who are capable of preventing said passage, or may comprise some other such device. Thus when the distance in the method exceeds a predetermined threshold (indicating that anomalous radioactive material is present), a signal activates the device so as to prevent passage of the anomalous radioactive material and/or of a vehicle transporting it. In a variation, the device is normally in a position in which passage of the anomalous radioactive material and/or of a vehicle transporting it is prevented by a barrier or other device. In this variation, a signal is generated when the distance in the method is below the predetermined threshold (indicating that no anomalous radioactive material is present) so as to remove the barrier (or other device) to passage of the anomalous radioactive material and/or of a vehicle transporting it.

In a third aspect of the invention there is provided a computer program comprising:

code for preparing, from a target gamma ray spectrum, a target data set comprising a plurality of intensity values, each intensity value being associated with an energy bin representing a gamma ray energy or range of gamma ray energies in the target gamma ray spectrum;

code for pre-processing (e.g. normalising) the target data set;

code for projecting the pre-processed (e.g. normalised) target data set into a multidimensional, e.g. principal component, space containing a pre-processed (e.g. normalised) data library projected into said multidimensional, e.g. principal component, space;

code for determining a distance between the projected pre-processed (e.g. normalised) target data set and one or more clusters of the projected pre-processed (e.g. normalised) data library in the multidimensional, e.g. principal component, space; and code for comparing the distance with a predetermined threshold distance so as to determine if an anomalous radioactive material is present in the target.

The computer program may additionally comprise:

code for preparing a reference data set from a plurality of reference gamma ray spectra, each reference data set comprising a plurality of intensity values, each intensity value being associated with an energy bin representing a gamma ray energy or range of gamma ray energies in said reference gamma ray spectrum; and code for pre-processing (e.g. normalising) each reference data set to obtain the pre-processed data library.

The computer program may additionally comprise code for producing a correlation matrix from the pre-processed data library. The computer program may additionally comprise code for performing Principal Component Analysis (PCA) on the pre-processed data library's correlation matrix so as to generate principal components for the principal component space.

In a fourth aspect of the invention there is provided a computer readable storage medium having a computer program recorded thereon, the program being executable by a computer apparatus to make the computer determine the presence or absence of anomalous radioactive materials in a target in a detection zone, said program comprising:

code for preparing, from a target gamma ray spectrum, a target data set comprising a plurality of intensity values, each intensity value being associated with an energy bin representing a gamma ray energy or range of gamma ray energies in the target gamma ray spectrum;

code for pre-processing (e.g. normalising) the target data set;

code for projecting the pre-processed (e.g. normalised) target data set into a multidimensional, e.g. principal component, space containing a pre-processed (e.g. normalised) data library projected into said multidimensional, e.g. principal component, space;

code for determining a distance between the projected pre-processed (e.g. normalised) target data set and one or more clusters of the projected pre-processed (e.g. normalised) data library in the multidimensional, e.g. principal component, space; and code for comparing the distance with a predetermined threshold distance so as to determine if an anomalous radioactive material is present in the target, The program may additionally comprise:

code for preparing a reference data set from a plurality of reference gamma ray spectra, each reference data set comprising a plurality of intensity values, each intensity value being associated with an energy bin representing a gamma ray energy or range of gamma ray energies in said reference gamma ray spectrum; and code for pre-processing each reference data set to obtain the pre-processed (e.g. normalised) data library.

The program may additionally comprise code for producing a correlation matrix from the pre-processed (e.g. normalised) data library. The program may additionally comprise code for performing Principal Component Analysis (PCA) on the pre-processed (e.g. normalised) data library's correlation matrix so as to generate principal components for the principal component space.

In a fifth aspect of the invention there is provided a computer program element for use in determining the presence or absence of anomalous radioactive materials in a target in a detection zone, said element comprising computer program code means to make a computer execute a procedure to:

prepare, from a target gamma ray spectrum, a target data set comprising a plurality of intensity values, each intensity value being associated with an energy bin representing a gamma ray energy or range of gamma ray energies in the target gamma ray spectrum;

pre-process (e.g. normalise) the target data set;

project the pre-processed (e.g. normalised) target data set into a multidimensional, e.g. principal component, space containing a pre-processed (e.g. normalised) data library projected into said multidimensional, e.g. principal component, space;

determine a distance between the projected pre-processed (e.g. normalised) target data set and one or more clusters of the projected pre-processed (e.g. normalised) data library in the multidimensional, e.g. principal component, space; and compare the distance with a predetermined threshold distance so as to determine if an anomalous radioactive material is present in the target.

The computer program element may additionally comprise computer program code means to make a computer execute a procedure to:

prepare a reference data set from a plurality of reference gamma ray spectra, each reference data set comprising a plurality of intensity values, each intensity value being associated with an energy bin representing a gamma ray energy or range of gamma ray energies in said reference gamma ray spectrum; and pre-process (e.g. normalise) each reference data set to obtain the pre-processed data library.

The computer program element may additionally comprise computer program code means to make a computer execute a procedure to produce a correlation matrix from the pre-processed (e.g. normalised) data library. The computer program element may additionally comprise computer program code means to make a computer execute a procedure to perform Principal Component Analysis (PCA) on the pre-processed (e.g. normalised) data library's correlation matrix so as to generate Principal components for the principal component space.

In a sixth aspect of the invention there is provided the use of an apparatus according to the invention, as described above, to determine the presence or absence of anomalous radioactive materials in a target in a detection zone.

In a seventh aspect of the invention there is provided a method for preventing passage of a target carrying anomalous radioactive materials, comprising:

conducting the method of the first aspect; and if the signal is generated in response to the presence of the anomalous radioactive material in the target, activating a barrier to prevent passage of the target; or if the signal is generated in response to the absence of the anomalous radioactive material in the target, activating a barrier to allow passage of the target.

In the first instance (if the signal is generated in response to the presence of the anomalous radioactive material in the target) the activating may comprise for example lowering of a boom gate, raising of bollards or road spikes, illuminating a "stop" sign or otherwise creating a barrier or impediment to passage of the target. In the second instance (if the signal is generated in response to the absence of the anomalous radioactive material in the target) the activating may comprise for example raising of a boom gate, lowering of bollards or road spikes, turning off a "stop" sign or otherwise removing a barrier or impediment to passage of the target.

BRIEF DESCRIPTION OF THE DRAWINGS

A preferred embodiment of the present invention will now be described, by way of an example only, with reference to the accompanying drawings wherein.

Figure 2:
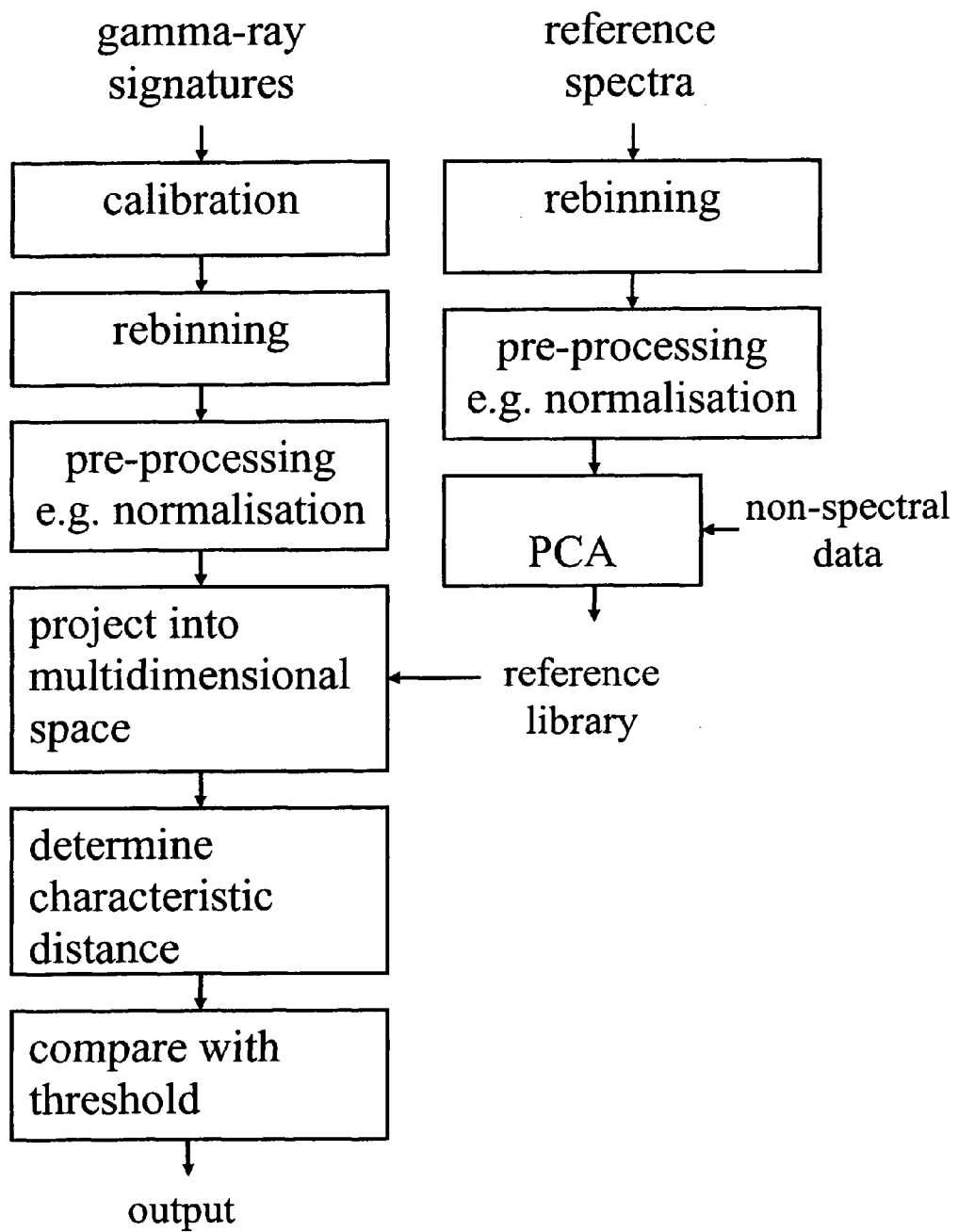
FIG. 2 is a block diagram showing the data processing steps of the method of the invention.

Appendix A is a pseudo-code representation of software for performing the method of FIG. 2.

DETAILED DESCRIPTION OF THE PREFERRED EMBODIMENTS

In order to determine if unauthorised materials are present in a sample, one approach is to obtain gamma ray spectra of unauthorised materials and to compare the gamma ray spectrum of the sample with those spectra in order to determine if any of the unauthorised materials are present in the spectrum. As discussed in the Background section, this approach presents certain practical problems. An alternative approach, adopted by the present inventors, is to acquire a data library representing acceptable radioactivity (e.g. known naturally occurring radioactive materials, or acceptable goods containing radioactive materials such as radiopharmaceutical products) and to identify if the sample emits radioactivity that is sufficiently different to the acceptable radioactivity to warrant further investigation. The data library may also include data from other sources (which may be normal sources or may be anomalous sources or some of which may be normal and others anomalous). Thus the present approach does not seek to identify the nature of the radioactive emitters in a sample but only to determine if they are anomalous. In this context the term "anomalous" refers to materials that are abnormal or are unacceptable or are unauthorised.

The data library may include reference gamma ray spectra obtained from known unacceptable (anomalous) sources. These may include special nuclear materials and/or industrial radioisotopes. The inclusion of these unacceptable source gamma ray spectra (and optionally associated supplementary data) in the data library may improve the discrimination between threat (anomalous) and benign (acceptable) sources when using the method of the invention.

The approach taken in the present invention involves comparing the sample with a data library. In order to accomplish this efficiently, the gamma ray spectra contributing to the library are processed according to a standard protocol and converted by principal component analysis into a number of uncorrelated principal components. This reduces the dimensionality of the problem so as to facilitate processing. In some instances principal component analysis (PCA) may be replaced by some other method for reducing the dimensionality of the data library, for example, a genetic algorithm, a neural network, partial least squares (PLS), inverse least squares, kernel PCA, LLE, Hessian LLE, Laplacian Eigenmaps, LTSA, isomap, maximum variance unfolding, Bolzman machines, projection pursuit, a hidden Markov model support vector machines, kernel regression, linear discriminant analysis and classification, k-nearest-neighbour analysis, fuzzy neural networks, Bayesian networks, or cluster analysis.

This approach enables supplementary data not derived from a gamma ray spectrum to be inputted into the method so as to further improve discrimination and reduce the incidence of false positives. Such supplementary data may for example include heat output, time variation of the source through the detection zone, geographical origin of the target, target supplier, gross count, manifest etc.

An important feature of the present method is the use of a correlation matrix in the PCA (known here as 'the correlation method') to determine the principal components. This results in various advantages including:

The correlation method looks to find the principal components of a standardised version of the data library, which avoids problems with using the prior art covariance method, where the relative intensities of measured spectra dominate the principal components and adversely affect performance;

The correlation method focuses more on the differences in spectral shape, which enables more accurate detection of an anomaly, and conversely provides less false alarms;

The correlation method allows additional input variables to be used in combination with the energy spectrum of a target Non-spectral data, for example the heat generated by the target and/or the time variation of these spectra as it travels through the detection zone, may be added to the analysis. Adding these may result in increased reliability in anomaly detection. Another key feature of the method is that each observed spectrum may be pre-processed by functions that manipulate the data in order to optimise the discrimination capability. These functions may include, but not be limited to, intensity normalisation, observation standardisation and a variable standardisation. For the intensity normalisation each observed spectrum is normalised by the energy bin with the maximum number of counts. This intensity normalisation removes the variability due to the speed with which the measured substance travels through the detection zone. For the observation standardisation, each observed spectrum is standardised to have zero mean and unit variance. For the variable standardisation, each energy bin of the observed spectrum is standardised by the mean and standard deviation of the respective energy bin of the data library. This variable standardisation enables variables of different measures to be more directly comparable.

The method may comprise calibrating the device used for obtaining the gamma ray spectra. It may comprise applying a calibration to the target gamma ray spectrum and/or to the reference gamma ray spectra. The calibration, either of the target gamma ray spectrum or of the reference gamma ray spectra, or of both, may be for the purpose of standardising the device used for obtaining the gamma ray spectra. The calibration may be conducted on a regular basis. It may be conducted each time a spectrum is acquired. It may not be conducted each time a spectrum is acquired. It may be for example conducted every 5 spectra, or every 10, 15, 20, 25, 30, 35, 40, 45 or 50 spectra. It may be conducted every hour, or every 2, 3, 4, 5, 6, 12, 24 or 48 hours. Thus over time the energy axis of the spectra may drift; and may require calibration as described above in order to restore the correct energy values of the energy axis.

A gamma ray spectrum may be obtained by use of a gamma ray detector. This may for example comprise a sodium iodide thallium doped based gamma ray detector. It may comprise a sodium iodide thallium doped based spectroscopic radiation portal monitor. It may comprise a signal amplifier for amplifying the signal. The raw gamma ray signals (either of the target or of reference samples) that are acquired may be passed to a multichannel analyser. They may be calibrated so as to compensate for drift of the energy axis in the detector. The multichannel analyser may divide the data in the spectrum into a number of bins (or energy ranges). Typically the multichannel analyser will generate about 1024 data bins, although there may be more or less than this depending on the analyser. It is preferable to reduce the number of energy bins, i.e. to rebin the data, thereby reducing the number of variables in the resulting data set. This may improve the computational speed. The energy bins of the original spectrum represent the smallest increment of energy interval of the gamma ray spectrum to which counts are attributed. In general, each interval, or bin, in the original spectrum has an identical Width in energy. Rebinning of the spectrum may involve uniformly increasing the width of each energy bin thereby decreasing the total number of bins over the full energy range and increasing the number of counts within the newly defined bins. This rebinning is not necessarily limited to linear functions. The rebinned spectrum may contain non-uniform bin widths which may, for example, be proportional to the energy squared or to some other suitable function. The rebinned spectrum may also contain user defined bin widths, which may vary over the energy range. The number of energy bins of the rebinned spectrum is effectively the number of variables in the data library, although supplementary variables may also be added as described elsewhere. The greater the number of variables, the greater the computational time of PCA. The bins can be rebinned to fit different functions. This may enable the spectra from multiple detectors to be combined. The rebinning of the reference data sets and the target data set may be such that all data sets use the same energy bins.

The data may then be normalised with respect to the highest number of counts across all energy bins. This removes the effects from the wide range of RPM (radiation portal monitor) acquisition times that can occur at ports of entry and the effect of variation of the speed of passage of a target through the detection zone of an RPM.

The data of each observed energy spectrum may be standardised or may not be standardised. This observation standardisation scales the variance, across all energy bins, to be unity.

The data may have each variable standardised or may not have each variable standardised. This variable standardisation enables variables of different measures to be more directly comparable.

The data library is obtained from reference gamma ray spectra (and optionally associated supplementary data) which are obtained from known sources. These may be naturally occurring radioactive materials, or may be sources that are known to be benign and/or acceptable, and may include any other type of source, for example anomalous or unacceptable sources. The reference gamma ray spectra may be treated in a similar fashion to the target spectra, so that they will be comparable and provide meaningful comparisons. The data library may also incorporate supplementary data that may assist in determining if the target should be regarded as anomalous. For example if it is known that targets from particular countries are more likely to be anomalous, country of origin data may be inputted into the data library so as to contribute to the reference data sets. Corresponding data will then also be inputted when scanning a target, so that the data will contribute similarly to the target data set. Similarly, if it is known that targets that have a higher mean temperature are more likely to be anomalous, mean temperature data (measured by a thermal detector) may be inputted into the data library. The data library may be augmented either intermittently or on a regular basis with additional reference data sets in order to improve the discrimination capabilities of the method (and of the system). The data library may be based on at least about 10 principal components, or at least about 11, 12, 13, 14 or 15 principal components, or on at most about 20 principal components, or on at most about 19, 18, 17, 16 or 15 principal components, or on about 10 to about 20 principal components, or on about 10 to 15, 15 to 20 or 12 to 18 principal components, e.g. about 10, 11, 12, 13, 14, 15, 16, 17, 18, 19 or 20 principal components. In some cases more than 20 principal components may be used, e.g. 21, 22, 23, 24, 25, 26, 27, 28, 29 or 30 or more. By reducing the dimensionality of the analysis, the task of comparing the target with the reference library is simplified so as to enable rapid, optionally real time, processing so that anomalous sources may be identified rapidly and in a timely fashion.

The PCA may be conducted by means of eigenanalysis on the correlation matrix of the input data (pre-processed reference spectra and optionally also supplementary data as described elsewhere). The eigenvalues and corresponding eigenvectors of the correlation matrix are then obtained. These are then ranked in order of the highest valued eigenvalues. The n eigenvectors with the largest n eigenvalues are then selected as the principal components, where n is a number selected so as to provide a compromise is between sufficient capability of the method and acceptable processing time (suitable numbers of principal components are described above). The choice of a suitable n may therefore depend on the power and speed of a processor (e.g. computer) used to conduct the method.

As an example of the data processing conducted in the method of the present invention, a multichannel analyser may generate a set of counts for different gamma ray energies in the gamma ray spectrum. These may be designated $S_1$ to $S_a$, where there are a total of a energy bins, representing the a different gamma ray energies. A simple rebinning of $S_1$ to $S_a$ may comprise pooling pairs of energy bins to form a rebinned data set $R_1$ to $R_b$, where a=2b (whereby the rebinning represents a halving of the number of energy bins) and $R_x=S_{2x-1}+S_{2x}$. As discussed elsewhere, other methods of rebinning may be used. The rebinned data may be normalised to the largest value of $R_1$ to $R_b$ to provide a gamma ray spectrum with energy bins $N_1$ to $N_b$. This data set may optionally be supplemented with additional data not obtained from the gamma ray spectrum: $A_1$ to $A_c$, so as to form a final data set $N_1, N_2, \ldots, N_b, A_1, A_2, \ldots, A_c$.

If the above data processing is conducted on m different reference samples (where m is preferably greater than or equal to b+c), a data matrix can be constructed where the m rows are the different data sets (or observations), with the b+c columns representing the variables. The correlation matrix of this data matrix is obtained, and the resulting eigenanalysis (or eigen decomposition) of this correlation matrix produces the p eigenvectors and eigenvalues pairs, where p=b+c. These may be designated $V_1$ to $V_p$ and $e_1$ to $e_p$ respectively (wherein eigenvalue $e_x$ corresponds to eigenvector $V_x$). The eigenvalues are then ranked in numerical order (i.e. highest first), and the largest n eigenvalues (typically about 1 to 20, but can be up to p) are retained. In this description the principal components are defined as the eigenvectors ordered in terms of the highest eigenvalues. However, it should be noted that some authors in the literature refer to the eigenvectors as the vector of coefficients or the loadings for the principal components, where the principal components refer to the derived variables.

Projecting the data set into the new multidimensional space is performed by multiplying the principle components (i.e. the selected eigenvectors) by the data set. Once the data library and the target spectrum have been projected into principal component space, a comparison can be made between them.

The benefits of using the correlation matrix rather than, for example, the covariance matrix, may include but not be limited to: (1) removing the scale dependence from PCA; and (2) the standardised variates are dimensionless and can be easily combined to give principal component scores, which is not the case for the covariance matrix.

The pre-processed data library is projected into a multidimensional space. The multidimensional space is not a physical space, but rather a mathematical construct within a computer or other processor for representing the data sets (both target and reference) so as to provide a useful comparison. The dimensionality of the multidimensional space may correspond to the number of principal components obtained (or selected) from the PCA. The data library may be represented by one or more clusters within the multidimensional space. When the pre-processed target spectrum is projected into this multidimensional space, a characteristic distance, for example a Mahalanobis distance, of the projected target spectrum from the clusters may be determined. The Mahalanobis distance is a measure used in classification techniques. The Mahalanobis distance is effectively a weighted Euclidean distance where the weighting is determined by the sample variance-covariance matrix. The larger this distance, the larger the likelihood that the target is anomalous, i.e. is atypical with reference to the reference materials and (if used) supplementary data. Thus if the distance is compared with a threshold distance, a determination may be made as to whether the target is anomalous and, if it deemed anomalous, an alarm may be raised. In some cases it may be useful to provide a signal indicating that the target is not anomalous in the event that the distance is smaller than the threshold distance. Alternatively, the distance may be converted into a probability that the target is anomalous, and this probability may be displayed as an output. A suitable alarm in response to an anomalous target may be for example an audible alarm (e.g. a horn, siren or similar), a visual alarm (e.g. a light, optionally a flashing light), activation of a barrier (e.g. lowering a boom gate, raising road spikes, closing a gate) to prevent passage of the target, or of a vehicle carrying the target, activation of an instruction to a driver of the target or vehicle (e.g. illumination of a STOP sign, activation of audible instructions to said driver) or some other type of alarm. The alarm may also be a logic state provided to another system for the purpose of recognising the alarm state and alarming. More than one of these types of alarm may be used. They may activate simultaneously. They may activate non-simultaneously. They may activate sequentially. Thus the apparatus of the invention may comprise one or more of an audible alarm device, a visual alarm device and a physical alarm device such as an activatable barrier. The method correspondingly may comprise activating the activatable barrier when a target is identified as anomalous or when a vehicle is identified as carrying an anomalous source. As mentioned previously, an alternative mode of operation is when a signal is generated only when the target is identified as not anomalous (i.e. as normal or acceptable). In this case an activatable barrier would be removed or retracted in response to the signal, allowing a vehicle carrying no anomalous materials to pass. Thus the method may comprise passing the signal to a barrier device which prevents passage of the target when the target is identified as carrying an anomalous source (i.e. when the distance is greater than or equal to a predetermined threshold) and which allows passage of the target when the target is identified as not carrying an anomalous source (i.e. when the distance is below the predetermined threshold). This device may be in a normally closed state (i.e. in a state in which passage of the target is prevented or inhibited), such that a signal is required to open it (so as to allow or facilitate passage of the target) in response to a determination that the target does not contain an anomalous source, or it may be in a normally open state (i.e. in a state in which passage of the target is allowed), such that a signal is required to close it (so as to inhibit or prevent passage of the target) in response to a determination that the target contains an anomalous source. As discussed above, it may be possible to provide a probability as the output. Thus the result could be expressed as a likelihood function. The likelihood that an anomalous event had occurred may be expressed as an integer with a preset value used to define whether or not an anomalous substance were present in the target. The apparatus of the invention may also comprise a camera or similar photographic recording device. This may be used for recording images of all targets or vehicles passing through the detection zone, or for recording images of targets or vehicles passing through the detection zone when an anomalous source is detected. It may be used for transmitting to an operator an image of all targets or vehicles passing through the detection zone, or for transmitting to said operator images of targets or vehicles passing through the detection zone when an anomalous source is detected. In this case the signal may be transmitted to a video display for displaying the image(s). Information from the camera or similar photographic device may be, used for acquiring supplementary data, or for determining the nature of supplementary data, for use in the PCA for determining if a target is anomalous. The method of the invention may comprise detecting, and recording and/or transmitting, an image of the vehicle or target or of a part (e.g. a number plate) thereof), either for each vehicle or target passing through the detection zone or for each vehicle or target passing through the detection zone which is identified as an anomalous source or as carrying an anomalous source.

In acquiring the target gamma ray spectrum, the target may pass through a detection zone, over which the detector is capable of detecting the spectrum. The source may pass through the detection zone at a mean velocity of about 1 to about 12 km/h, or about 1 to 8, 1 to 5, 5 to 10, 1 to 3, 3 to 5 or 2 to 4 km/h, e.g. about 1, 1.5, 2, 2.5, 3, 3.5, 4, 4.5, 5, 6, 7, 8, 9, 10, 11 or 12 km/h. The time for passage of the target through the detection zone may be about 5 to about 80 seconds, or about 5 to 50, 5 to 20, 5 to 15, 10 to 80, 50 to 80, 20 to 50 or 5, 5 to 15, 15 to 20, 5 to 10, 10 to 15 or 7 to 12 seconds, e.g. about 5, 6, 7, 8, 9, 10, 11, 12, 13, 14, 15, 20, 25, 30, 35, 40, 45, 50, 55, 60, 65, 70, 75 or 80 seconds. The detection zone may be about 5 to about 25 m long, or about 5 to 20, 5 to 15, 5 to 10, 10 to 25, 15 to 25 or 10 to 10 m, e.g. about 5, 10, 15, 20 or 25 m. The target may be, or may be transported by, a person, a truck or a car or a train carriage or some other vehicle or part thereof.

Figure 1:
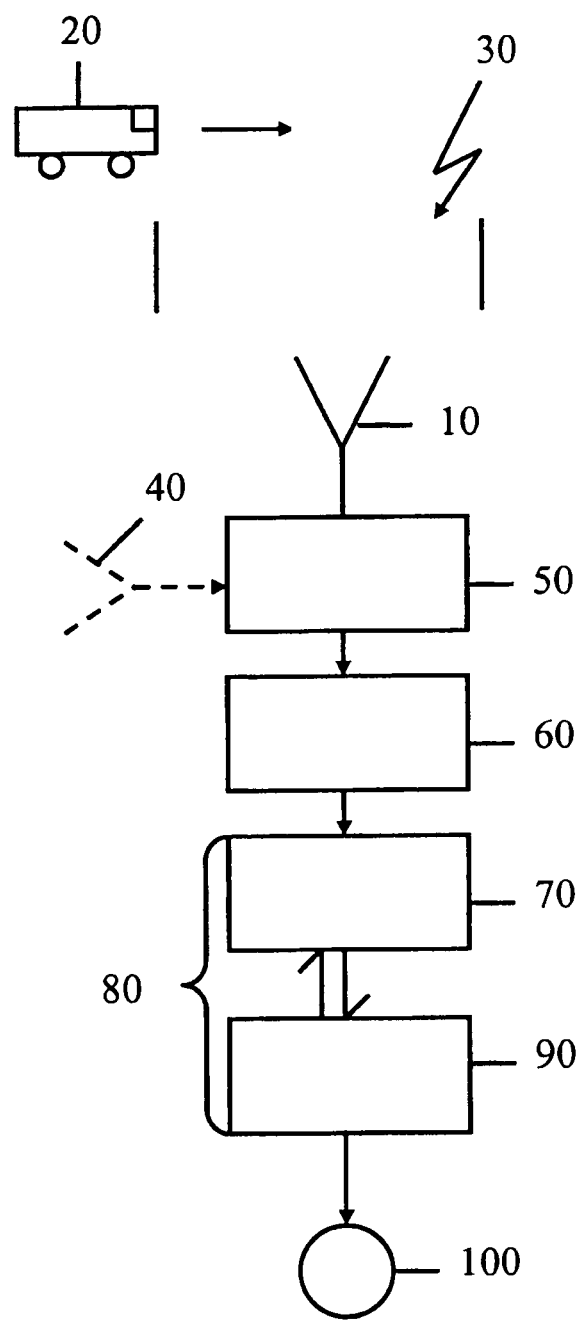
FIGS. 1 and 1a are block diagrams of apparatuses according to the invention.

FIG. 1 shows a block diagram of a suitable apparatus for use in the present invention. Thus detector 10 is a spectroscopic portal detector, e.g. a NaI(Tl) based detector, deployed to acquire a gamma ray spectrum from sources, e.g. vehicle 20 passing through detection zone 30. In some embodiments the main detector (detector 10) is capable of collecting both the reference spectra and the target spectra. For example, background reference spectra may be acquired when no target is within the detection zone. If a reference detector is used it may be remote from the portal monitor. The reference detector, if present, may be shielded from the detection zone.

Figure 1A:
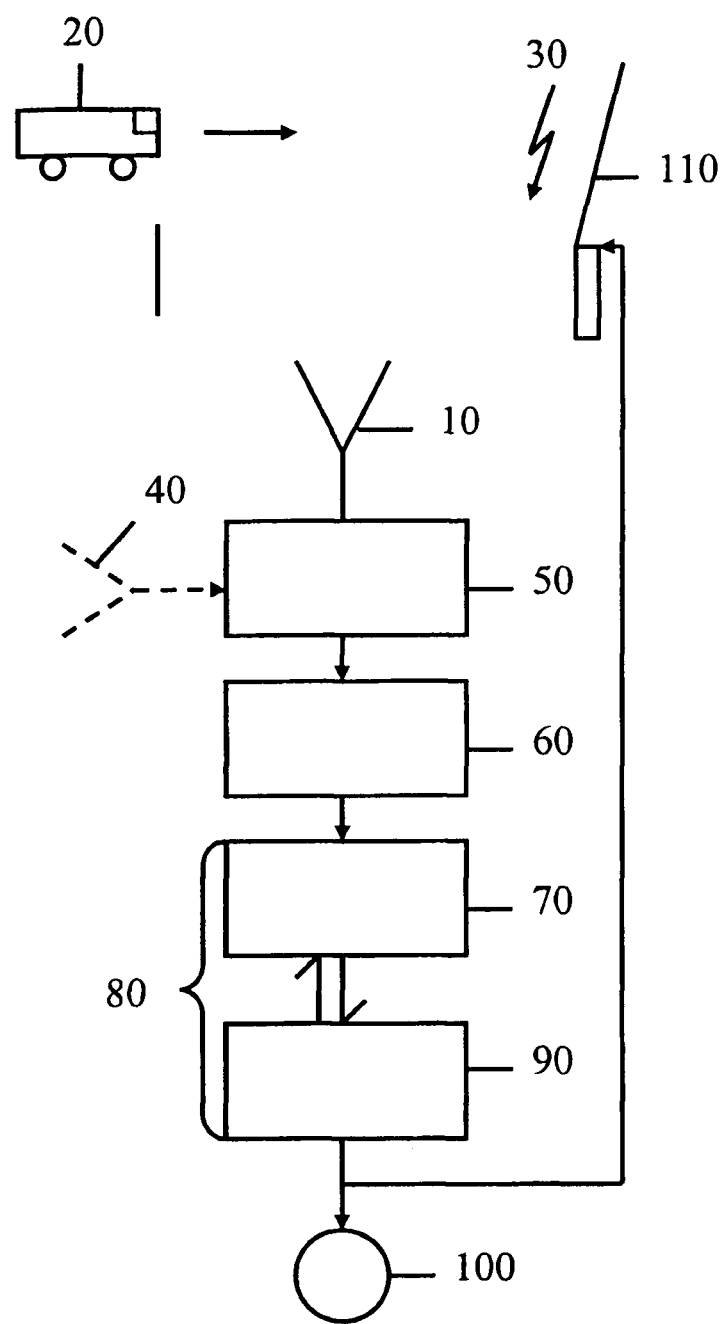

The apparatus may also comprise a reference detector 40 for acquiring reference spectra of NORM, although, as discussed above, this may in some cases be omitted. It may also comprise one or more secondary detectors (not shown) for acquiring supplementary data, for example thermal data from vehicle 20 as it passes through s detection zone 30, and may also comprise one or more secondary reference detectors (not shown) for acquiring supplementary reference data. Amplifier 50 is coupled to detector 10 provided for amplifying data from detector 10, and, if present, reference detector 40. This is in turn coupled to multichannel analyser 60 for providing an initial binning of the amplified data from amplifier 50. It is coupled to the memory 70 of computer 80 so that inputted data from analyser 60 may be stored. Memory 70 also contains a data library obtained from NORM and other materials. Memory 70 is coupled to processor 90 for processing the data obtained by detector 10 and determining if target 20 is anomalous. Output 100 is provided to signal an alarm if target 20 is determined to be anomalous. Output 100 may take the form of a visual output, e.g. an alarm light. It may take the form of sound output, e.g. an audible signal. It may take the form of an action, e.g. lowering of a boom gate to prevent passage of target 20. It may take the form of more than one of these simultaneously (or sequentially). FIG. 1a shows a block diagram of an apparatus similar to that of FIG. 1 in which an activatable barrier 110 is present in order to prevent passage of vehicle 20 in the event that an anomalous target is identified. In FIG. 1, output 100 may be in the form of an audible alarm.

In operation therefore, target 20 passes through detection zone 30. This typically does not involve target 20 stopping its forward motion, and commonly takes about 5 to about 80 seconds. Detector 10 acquires a gamma ray spectrum of target 20 during this period and passes the spectrum to amplifier 50, which amplifies the signals of the spectrum. The amplified spectrum then passes to multichannel analyser 60 which performs an initial binning of the data in the amplified spectrum and passes the binned spectrum to memory 70 for storage. Detector 10 may also be used for acquiring reference spectra for use in creating a data library. Alternatively or additionally reference detector 40 may be used for this purpose. In any event, the reference spectra are processed as described above for the target spectrum, and then passed to memory 70. Spectral data and optionally other data obtained from supplementary detectors are passed to processor 90 for processing: reference data is used to generate a data library which is projected into multidimensional space by using the processor. The target spectrum is similarly processed and projected into this multidimensional space in order to obtain a characteristic distance of the projected target spectrum from the projected data library. Processor 90 then determines from this distance whether target 20 is deemed to be anomalous and, if it is anomalous, generates a signal to output 100. Appropriate action may then be taken, for example target 20 may be diverted for further investigation, or a barrier may be lowered in order to prevent passage of target 20, or some other action may be taken. In the apparatus of FIG. 1a; output 100 is an audible alarm. Thus if the target is determined to be anomalous, alarm 100 is sounded. Also, if the target is determined to be anomalous, activatable barrier 110 is activated so as to prevent passage of target 20.

FIG. 2 shows a flow chart illustrating the method of the invention. Initially reference spectra are rebinned and preprocessed and, optionally together with supplementary data, analysed by PCA on the correlation matrix so as to generate the principal components. Separately, a target spectrum is rebinned and pre-processed so as to generate a pre-processed target data set. The pre-processed target data set is then projected together with the pre-processed data library into multidimensional space, and a is characteristic distance of the pre-processed target data set from clusters of the pre-processed data library in the multidimensional space is determined. This is then compared with a threshold value in order to determine if the target spectrum was obtained from an anomalous source.

Figure 3A:
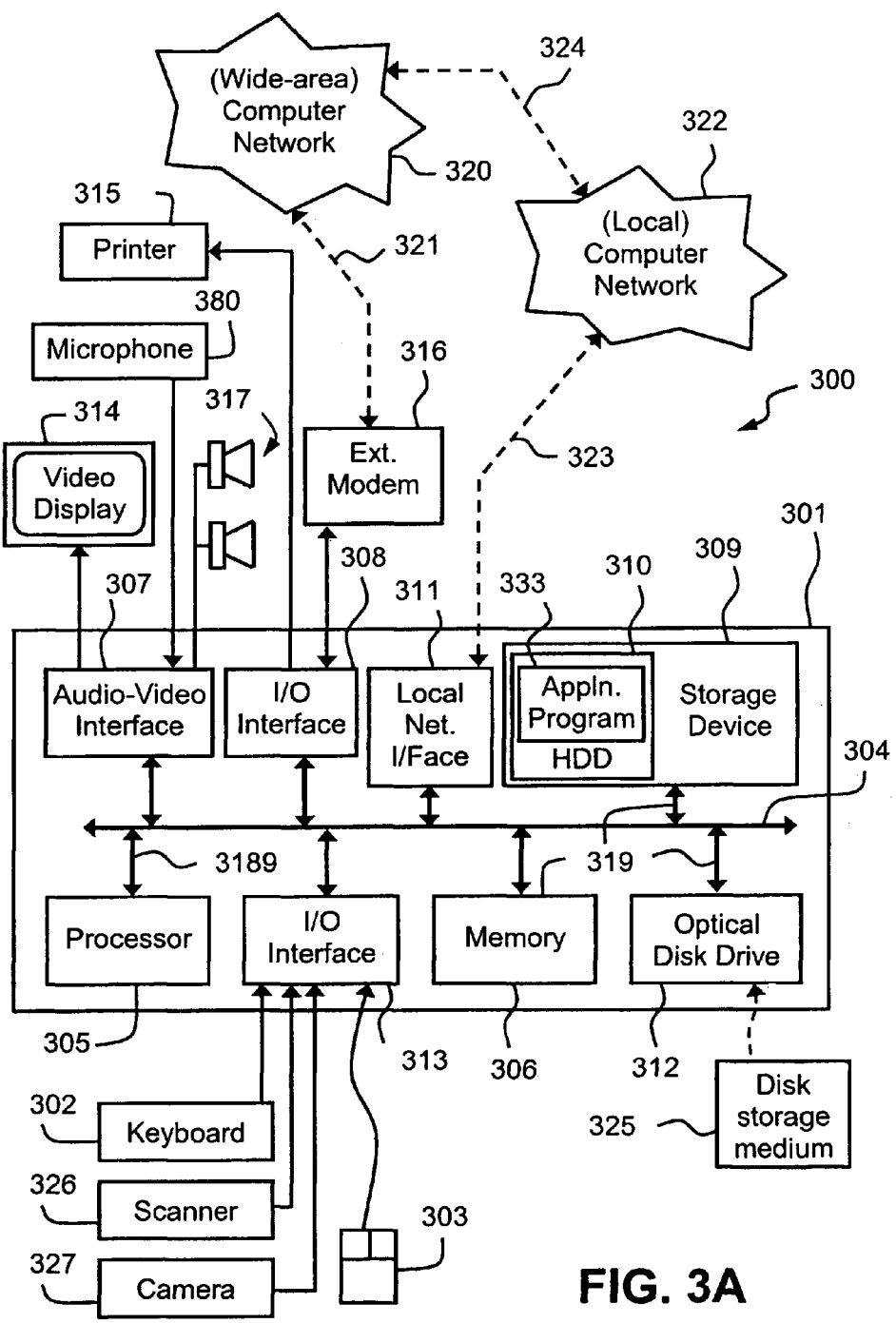
FIGS. 3A and 3B form a schematic block diagram of a general purpose computer system upon which the arrangements described can be practised.
Figure 3B:
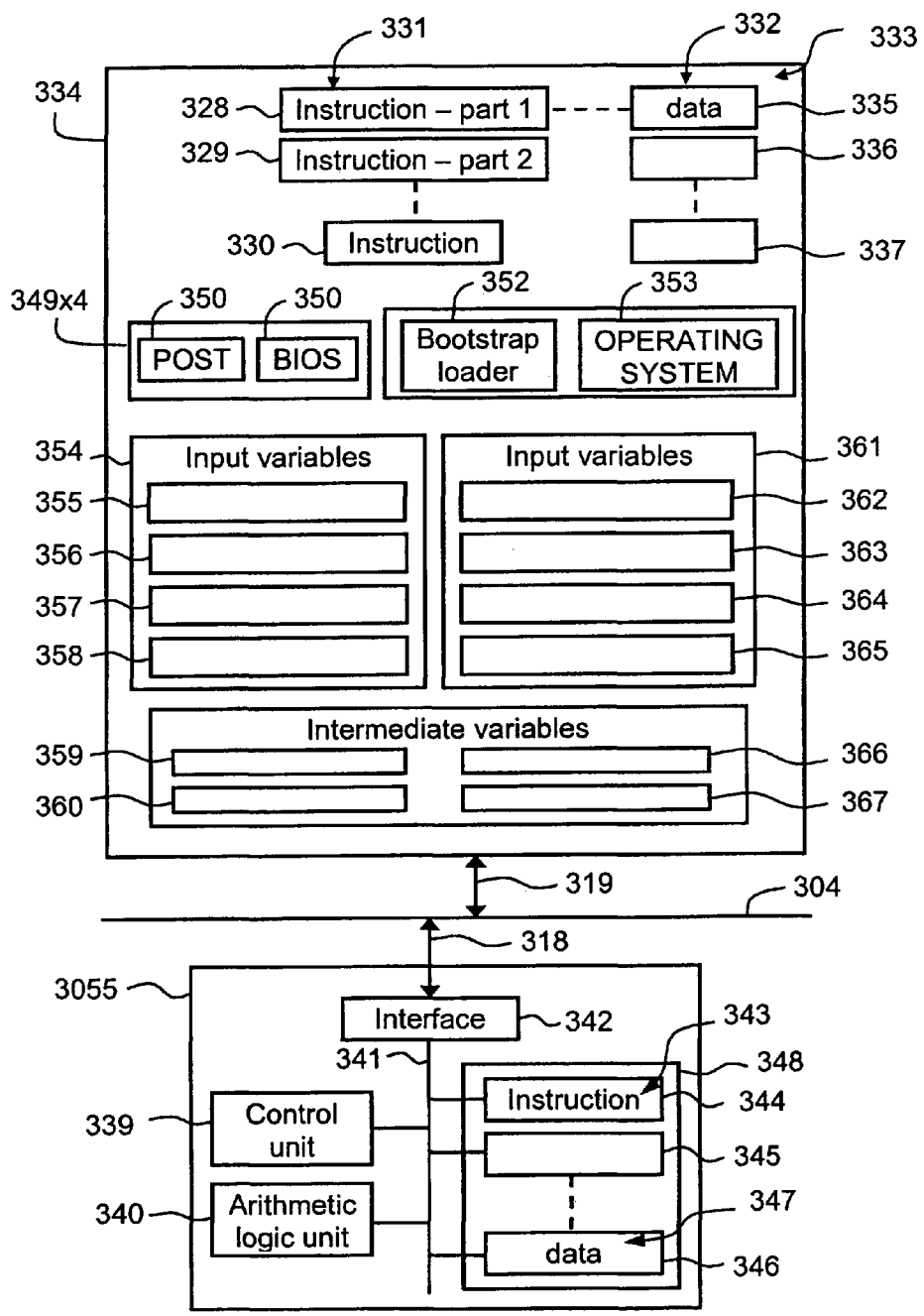

FIGS. 3A and 3B collectively form a schematic block diagram of a general purpose computer system 300, upon which the various arrangements described can be practiced.

As seen in FIG. 3A, the computer system 300 is formed by a computer module 301, input devices such as a keyboard 302, a mouse pointer device 303, a scanner 326, a camera 327, and a microphone 380, and output devices including a printer 315, a display device 314 and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modem. Alternatively, where the connection 321 is a high capacity (e.g. cable) connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and semiconductor read only memory (ROM). The module 301 also includes an number of input/output (I/O) interfaces including an audio-video interface 307 that couples to the video display 314, loudspeakers 317 and microphone 380, an. I/O interface 313 for the keyboard 302, mouse 303, scanner 326, camera 327 and optionally a joystick (not illustrated), and an interface 308 for the external modem 316 and s printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area, Network (LAN). As also illustrated, the local network 322 may also couple to the wide network 320 via a connection 324, which would typically include a so-called "firewall" device or device of similar functionality. The interface 311 may be formed by an Ethernet™ circuit card, a Bluetooth™ wireless arrangement or an IEEE 802.11 wireless arrangement.

The interfaces 308 and 313 may afford either or both of serial and parallel is connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g. CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations, Apple Mac™ or alike computer systems evolved therefrom.

The method of the present invention may be implemented using the computer system 300 wherein the processes of FIG. 2, described above, may be implemented as one or more software application programs 333 executable within the computer system 300. In particular, the steps of the method are effected by instructions 331 in the software 333 that are carried out within the computer system 300. The software instructions 331 may be formed as one or more code modules, each for performing one or more particular tasks. The software may also be divided into two separate parts, in which a first part and the corresponding code modules performs the method and a second part and the corresponding code modules manage a user interface between the first part and the user.

The software 333 is generally loaded into the computer system 300 from a computer readable medium, and is then typically stored in the HDD 310, as illustrated in FIG. 3A, or the memory 306, after which the software 333 can be executed by the computer system 300. In some instances, the application programs 333 may be supplied to the user encoded on one or more CD-ROM 325 and read via the corresponding drive 312 prior to storage in the memory 310 or 306. Alternatively the software 333 may be read by the computer system 300 from the networks 320 or 322 or loaded into the computer system 300 from other computer readable media. Additionally or alternatively; data, for example the data library or reference spectra used in preparing the data library, may be stored in the memory 310 or 306 or may be loaded into said memory from a CD or other computer readable medium, or over the internet or by some other means. Computer readable storage media refers to any storage medium that participates in providing instructions and/or data to the computer system 300 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 301. Examples of computer readable transmission media that may also participate in the provision of software, application programs, instructions and/or data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned, above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory devices (including the HDD 310 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306. A program permanently stored in a hardware device such as the ROM 349 is sometimes referred to as firmware. The POST program 350 examines hardware within the computer module 301 to ensure proper functioning, and typically checks the processor 305, the memory (309, 306), and a basic input-output systems software (BIOS) module 351, also typically stored in the ROM 349, for correct operation. Once the POST program 350 has run successfully, the BIOS 351 activates the hard disk drive 310. Activation of the hard disk drive 310 causes a bootstrap loader program 352 that is resident on the hard disk drive 310 to execute via the processor 305. This loads an operating system 353 into the RAM memory 306 upon which the operating system 353 commences operation. The operating system 353 is a system level application, executable by the processor 305, to fulfil various high level functions, including processor management, memory management, device management, storage management, software application interface, and generic user interface.

The operating system 353 manages the memory (309, 306) in order to ensure that each process or application running on the computer module 301 has sufficient memory in which to execute without colliding with memory allocated to another process. Furthermore, the different types of memory available in the system 300 must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

The processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal buses 341 functionally interconnect these functional modules. The processor 305 typically also has one or more interfaces 342 for communicating with external devices via the system bus 304, using a connection 318.

The application program 333 includes a sequence of instructions 331 that may include conditional branch and loop instructions. The program 333 may also include data 332 which is used in execution of the program 333. The instructions 331 and the data 332 are stored in memory locations 328-330 and 335-337 respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328-329.

In general, the processor 305 is given a set of instructions which are executed therein. The processor 305 then waits for a subsequent input, to which it reacts to by executing another set of instructions. Each input may be provided from one or more of a number of sources, including data generated by one or more of the input devices 302, 303, data received from an external source across one of the networks 320, 322, data retrieved from one of the storage devices 306, 309 or data retrieved from a storage medium 325 inserted into the corresponding reader 312. The execution of a set of the instructions may in some cases result in output of data. Execution may also involve storing data or variables to the memory 334.

The disclosed arrangements use input variables 354, that are stored in the memory 334 in corresponding memory locations 355-358. The arrangements produce output variables 361, that are stored in the memory 334 in corresponding memory locations 362-365. Intermediate variables may be stored in memory locations 359, 360, 366 and 367.

The register section 344-346, the arithmetic logic unit (ALU) 340, and the control unit 339 of the processor 305 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIG. 2 is associated with one or more s segments of the program 333, and is performed by the register section 344-347, the ALU 340, and the control unit 339 in the processor 305 working together to perform the fetch, decode, and execute cycles for every instruction in the instruction set for the noted segments of the program 333.

The method of the invention may alternatively be implemented in dedicated hardware such as one or more integrated circuits performing the functions or sub functions of the method. Such dedicated hardware may include graphic processors, digital signal processors, Field Programmable Gate Arrays (FPGA's) or one or more microprocessors and associated memories.

In the context of this specification, the word "comprising" means "including principally but not necessarily solely" or "having" or "including", and not "consisting only of". Variations of the word "comprising", such as "comprise" and "comprises" have correspondingly varied meanings.

APPENDIX A

Pseudo-code representation of software for performing the method of FIG. 2
  Calibrate reference gamma ray spectra
  Rebin calibrated gamma ray spectra
  Pre-process rebinned gamma ray spectra
  Prepare a pre-processed data library that consists of the pre-processed reference gamma-ray spectra, optionally together with supplementary data, in a matrix form
  Conduct principal component analysis on the correlation matrix of the pre-processed data library, to generate the principal components
  Store the principal components in memory
  Calibrate target gamma fay spectrum
  Rebin calibrated target spectrum
  Pre-process rebinned target spectrum and optionally supplement with supplementary data of the same type used for the data library
  Project pre-processed data library and pre-processed target spectrum into multidimensional space defined by principal components obtained by the principal component analysis
  Determine characteristic distance between the clusters from the pre-processed data library and pre-processed target spectrum in multidimensional space
  Compare characteristic distance with threshold distance
  Generate output signal

The invention claimed is:

1. A method for determining the presence or absence of anomalous radioactive materials in a target in a detection zone, said method comprising:

(i) obtaining a target gamma ray spectrum from the target;

(ii) preparing, from the target gamma ray spectrum, a target data set comprising a plurality of intensity values, each intensity value being associated with an energy bin representing a gamma ray energy or range of gamma ray energies in the target gamma ray spectrum;

(iii) pre-processing the target data set;

(iv) performing Principal Component Analysis (PCA) on a correlation matrix of a pre-processed data library so as to generate principal components for a principal component space, wherein the pre-processed data library is obtained by a process comprising obtaining a data library comprising reference gamma ray spectra from Naturally Occurring Radioactive Materials and optionally other anomalous sources;

(v) projecting the pre-processed target data set and the pre-processed data library into the principal component space;

(vi) determining a distance between the projected pre-processed target data set and one or more clusters of the projected pre-processed data library in the principal component space; and (vii) comparing the distance with a predetermined threshold distance so as to determine if an anomalous radioactive material is present in the target, whereby either:

if the distance is greater than or equal to the threshold distance, a signal is generated in response to the presence of the anomalous radioactive material in the target; or if the distance is less than the threshold distance, a signal is generated in response to the absence of the anomalous radioactive material in the target.

2. The method of claim 1 wherein if the distance is greater than or equal to the threshold distance a signal is generated in response to the presence of the anomalous radioactive material in the target.

3. The method of claim 1 wherein the step of pre-processing comprises normalising such that the pre-processed target data set is a normalised target data set and the pre-processed data library is a normalised data library.

4. The method of claim 1 additionally comprising the step of rebinning the target data set prior to the step of pre-processing the target data set.

5. The method of claim 1 wherein the pre-processed data library is obtained by a process comprising:
   iv-a) preparing a reference data set from each of the reference gamma ray spectra, each reference data set comprising a plurality of intensity values, each intensity value being associated with an energy bin representing a gamma ray energy or range of gamma ray energies in said reference gamma ray spectrum; and
   iv-b) pre-processing each reference data set to obtain the pre-processed data library.

6. The method of claim 5 wherein step iv-b) comprises normalising said data sets, whereby the pre-processed data library is a normalised data library.

7. The method of claim 5 additionally comprising the step of rebinning each reference data set prior to the step of pre-processing the target data sets.

8. The method of claim 1 wherein the principal component space comprises less than about 20 principal components.

9. The method of claim 1 wherein the target data set and the data library both comprise supplementary data not derived from a gamma ray spectrum.

10. The method of claim 9 wherein the supplementary data comprises at least one of: temperature of the target, heat output of the target, time variation of the target as it passes through the detection zone, geographical origin of the target, target supplier, gross count and manifest.

11. The method of claim 1 wherein the distance of step (v) is a Mahalanohis distance.

12. The method of claim 1 wherein step (i) comprises acquiring the target gamma ray spectrum as the target passes through the detection zone.

13. The method of claim 12 wherein step (i) is conducted without the target stopping in the detection zone.

14. The method of claim 1 wherein the target gamma ray spectrum is acquired in less than about 10 seconds.

15. The method of claim 1 wherein the target gamma ray spectrum is acquired by means of a portable or fixed gamma radiation monitor system.

16. An apparatus tor determining the presence or absence of anomalous radioactive materials in a target in a detection zone, said apparatus comprising:
   a detector for obtaining a target gamma ray spectrum from the target,
   a memory for storing the target gamma ray spectrum and a pre-processed data library,
   a processor coupled to the memory for preparing, from the target gamma ray spectrum, a target data set comprising a plurality of intensity values, each bin being associated with an energy bin representing a gamma ray energy or range of gamma ray energies in the target gamma ray spectrum; pre-processing the target data set; performing Principal Component Analysis (PCA) on a correlation matrix of a pre-processed data library so as to generate principal components for a principal component space, wherein the pre-processed data library is obtained by a process comprising obtaining a data library comprising reference gamma ray spectra from Naturally Occurring Radioactive Materials and optionally other anomalous sources; projecting the pre-processed target data set and the pre-processed data library into the principal component space; determining a distance between the projected pre-processed target data set and one or more dusters of the projected pre-processed data library in the principal component space; and comparing the distance with a predetermined threshold distance so as to determine if an anomalous radioactive material is present in the target, whereby either (a) if the distance is greater than or equal to the threshold distance a signal is generated in response to the presence of the anomalous radioactive material in the target or (b) if the distance is less than the threshold distance a signal is generated in response to the absence of the anomalous radioactive material in the target; and
   an output device for (a) accepting the signal when an anomalous radioactive material is present in the target in order to generate a physical response to the presence of the anomalous radioactive material or for (b) accepting the signal when an anomalous radioactive material is absent in the target in order to generate a physical response to the absence of the anomalous radioactive material.

17. The apparatus of claim 16 wherein the detector is capable of obtaining reference gamma ray spectra from Naturally Occurring Radioactive Materials (NORM) and the processor is capable processing the reference gamma ray spectra to form the pre-processed data library from the pre-processed reference spectra.

18. A computer readable storage medium having a computer program recorded thereon, the program being executable by a computer apparatus to make the computer determine the presence or absence of anomalous radioactive materials in a target in a detection zone, said program comprising:
   code for preparing from a target gamma ray spectrum a target data set comprising a plurality of intensity values; each intensity value being associated with an energy bin representing a gamma ray energy or range of gamma ray energies in the target gamma ray spectrum;
   code for pre-processing the target data set;
   code for performing Principal Component Analysis (PCA) on a correlation matrix of a pre-processed data library so as to generate principal components for a principal component space, wherein the pre-processed data library is obtained by a process comprising obtaining a data library comprising reference gamma ray spectra from Naturally Occurring Radioactive Materials and optionally other anomalous sources;
   code for projecting the pre-processed target data set and the pre-processed data library into the principal component space;
   code for determining a distance between the projected pre-processed target data set and one or more clusters of the projected pre-processed data library in the principal component space; and
   code for comparing the distance with a predetermined threshold distance so as to determine if an anomalous radioactive material is present in the target.

19. The computer readable storage medium of claim 18 wherein said program additionally comprises:
   code for preparing a reference data set from a plurality of reference gamma ray spectra, each reference data set comprising a plurality of intensity values, each intensity value being associated with an energy bin representing a gamma ray energy or range of gamma ray energies in said reference gamma ray spectrum; and code for pre-processing each reference data set to obtain the pre-processed data library.

20. A method for preventing passage of a target carrying anomalous radioactive materials, comprising:

conducting the method of claim 1; and if the signal is generated in response to the presence of the anomalous radioactive material in the target, activating a barrier to prevent passage of the target; or if the signal is generated in response to the absence of the anomalous radioactive material in the target, activating a barrier to allow passage of the target.

* * * * *

UNITED STATES PATENT AND TRADEMARK OFFICE
CERTIFICATE OF CORRECTION

PATENT NO. : 8,779,370 B2
APPLICATION NO. : 13/509086
DATED : July 15, 2014
INVENTOR(S) : Reinhard et al.

Page 1 of 2

It is certified that error appears in the above-identified patent and that said Letters Patent is hereby corrected as shown below:

On the title page, in the second column, in Item (57), ABSTRACT, line 5, please delete "comprise" and insert --comprises--.

In the Drawing Sheets:

In Drawing Sheet 4 of 5, Figure 3A, at the connector to the arrow above Processor 305, please delete reference number "3189" and insert --318--.

In Drawing Sheet 4 of 5, Figure 3A, at the connector above Memory 306, please delete reference number "319".

In Drawing Sheet 5 of 5, Figure 3B, at the connector to the arrow below Memory 334, please delete reference number "319".

In Drawing Sheet 5 of 5, Figure 3B, at the connector to the lower processor block, please delete reference number "3055" and insert --305--.

In Drawing Sheet 5 of 5, Figure 3B, at the arrow to Instruction 344, please delete reference number "343".

In the Specification:

In column 5, line 16, after "plurality" please insert --of--.

In column 6, line 30, please delete "arid" and insert --and--.

In column 10, line 19, please delete "machines" and insert --machine--.

In column 10, line 42, please delete "less" and insert --fewer--.

Signed and Sealed this
Fourth Day of August, 2015

Michelle K. Lee
*Director of the United States Patent and Trademark Office*

CERTIFICATE OF CORRECTION (continued)

U.S. Pat. No. 8,779,370 B2

In column 11, line 36, please delete "Width" and insert --width--.

In column 12, line 50, please delete "is between" and insert --between--.

In column 13, line 24, please delete "principle" and insert --principal--.

In column 13, line 56, before "deemed" please insert --is--.

In column 14, line 53, please delete "may be, used" and insert --may be used--.

In column 14, line 59, please delete "thereof)" and insert --thereof--.

In column 15, line 29, please delete "s detection" and insert --detection--.

In column 16, line 13, please delete the ";" after "1a" and insert a --,-- (--1a,--).

In column 16, line 26, please delete "a is" and insert --a--.

In column 16, line 56, please delete "an." and insert --an--.

In column 16, line 59, please delete "s printer" and insert --printer--.

In column 17, line 6, please delete "is".

In column 17, line 35, please delete "performs" and insert --perform--.

In column 18, line 5, please delete the "," after "mentioned".

In column 19, line 16, please delete "to by" and insert --by--.

In column 19, line 51, please delete "s segments" and insert --segments--.

<u>In APPENDIX A</u>:

In column 20, line 19, please delete "gamma fay" and insert --gamma ray--.

<u>In the Claims</u>:

In column 22, line 32, Claim 17, please delete "capable" and insert --capable of--.

In column 22, line 41, Claim 18, please delete the ";" after "values" and insert a --,--.